(12) United States Patent
Gee

(10) Patent No.: US 6,813,570 B2
(45) Date of Patent: Nov. 2, 2004

(54) OPTIMIZED CONVECTION BASED MASS AIRFLOW SENSOR CIRCUIT

(75) Inventor: Gregory P. Gee, Waterford, MI (US)

(73) Assignee: Delphi Technologies, Inc., Troy, MI (US)

( * ) Notice: Subject to any disclaimer, the term of this patent is extended or adjusted under 35 U.S.C. 154(b) by 16 days.

(21) Appl. No.: 10/283,831

(22) Filed: Oct. 29, 2002

(65) Prior Publication Data

US 2003/0212510 A1 Nov. 13, 2003

Related U.S. Application Data

(60) Provisional application No. 60/380,237, filed on May 13, 2002.

(51) Int. Cl.[7] .......................... G01F 17/00; G01F 23/00
(52) U.S. Cl. ....................................................... 702/50
(58) Field of Search ............................ 702/50, 85, 99, 702/100, 104; 73/204.15, 204.17, 204.18, 204.19

(56) References Cited

U.S. PATENT DOCUMENTS

| 3,905,229 | A | | 9/1975 | Togo et al. | |
|---|---|---|---|---|---|
| 4,807,151 | A | | 2/1989 | Citron | |
| 4,934,189 | A | | 6/1990 | Tanimoto et al. | |
| 4,987,549 | A | | 1/1991 | Gee | |
| 5,084,667 | A | * | 1/1992 | Drori et al. | 323/298 |
| 5,094,105 | A | * | 3/1992 | Emmert et al. | 73/204.25 |
| 5,319,971 | A | * | 6/1994 | Osswald et al. | 73/204.26 |
| 5,461,910 | A | * | 10/1995 | Hodson et al. | 73/170.12 |
| 5,461,913 | A | * | 10/1995 | Hinkle et al. | 73/204.25 |
| 6,047,597 | A | * | 4/2000 | Kleinhans | 73/204.15 |
| 6,094,982 | A | | 8/2000 | Suzuki | |
| 6,230,560 | B1 | * | 5/2001 | Suzuki | 73/204.25 |
| 6,321,735 | B2 | | 11/2001 | Grieve et al. | |

OTHER PUBLICATIONS

Wojslaw "Everything you Wanted to Know About Digitally Programmable Potentiometers"Catalyst www.catalyst-semiconductor.com; Copyright 2001 by Catalyst Semiconductor, Inc.
Copy of PCT Search Report Dated Sep. 29, 2003.
Copy of PCT Search Report Dated Oct. 9, 2003.

\* cited by examiner

*Primary Examiner*—John Barlow
*Assistant Examiner*—Demetrius R. Pretlow
(74) *Attorney, Agent, or Firm*—Jimmy L. Funke

(57) ABSTRACT

A method and apparatus for measuring the amount of flow of a flowing medium. The method and apparatus include a bridge circuit configured to develop a bridge voltage Vb such that the magnitude of the bridge voltage Vb is indicative of the amount of flow. The bridge circuit is configured without having an ambient temperature sensor, thus the bridge voltage is uncompensated with respect to ambient temperature. A thermistor circuit is configured to generate a temperature reference voltage indicative of ambient temperature. A conditioning circuit is configured to receive the uncompensated bridge voltage and the temperature reference voltage to process the same and generate a compensated bridge voltage with respect to ambient temperature. The compensated bridge voltage is indicative of fluid flow

23 Claims, 4 Drawing Sheets

OPTIMIZED CONVECTION BASED MASS AIRFLOW SENSOR CIRCUIT

CROSS REFERENCE TO RELATED APPLICATIONS

This application claims priority to U.S. Provisional Application Ser. No. 60/380,237 filed on May 13, 2002, which is incorporated herein in its entirety.

TECHNICAL FIELD

This invention relates to a flowmeter of the "hot wire" variety, and more particularly, to a circuit for temperature compensating such a flowmeter.

BACKGROUND OF THE INVENTION

Mass air flow meters used in automotive vehicles often are of the constant temperature anemometer type. In these meters, a sensing element is electrically heated to a constant temperature differential above the ambient air temperature. Heat is convectively removed from the element by the airflow and the current flowing in the element replaces the heat lost by convection. As the mass air flow varies, the current required to maintain the requisite temperature also varies such that the current is a known function of the mass air flow.

Typically, a "hot wire" type flowmeter includes a self-heated sensor resistor having a resistance RH which is a function of its temperature. In turn, the temperature of the heated resistor is determined at least in part by the difference between the heat generated within the heated resistor as a function of the voltage applied across the resistor and the heat transferred away from the heated resistor as a function of the amount of cooling fluid flow past the resistor. In addition, it is usual for a "hot wire" flowmeter to include an ambient temperature sensing resistor having a resistance RA determined by the ambient temperature of the flowing fluid.

Hot element anemometers frequently use a Wheatstone bridge configuration for the sensing elements. As shown in FIG. 1, it is commonplace to employ a flow sensing resistor RH in one leg of a bridge 10 and an ambient temperature sensing resistor RA in another leg of bridge 10. In a bridge-type "hot wire" flowmeter, the self-heated resistor RH and the ambient temperature resistor RA are connected within a bridge circuit across which a voltage Vb is developed. In terms of fundamental structure, the bridge circuit includes a signal side for deriving a signal voltage $V_{RL}$ which is a voltage divided function of the bridge voltage Vb as determined at least in part by the resistance RH of the sensor resistor in ratio to the resistance RL of a power dissipating resistor. The bridge circuit further includes a reference side for defining a reference voltage Vr which is a voltage divided function of the bridge voltage Vb as determined at least in part by the sum (RA+R1) of the resistance RA of the ambient resistor plus the resistance R1 of a ballast resistor in ratio to the resistance R2 of a calibration resistor.

It is common in a bridge-type flowmeter to drive the bridge circuit with an operational amplifier which compares the signal voltage $V_{RL}$ with the reference voltage Vr. More specifically, the amplifier is responsive to the difference between the two voltages $V_{RL}$ and Vr to alter the bridge voltage Vb thereby correspondingly altering the voltage applied across the self-heated resistor so as to change the heat generated within the resistor. As a result, the temperature of the heated resistor and its related resistance RH are modified such that the signal voltage $V_{RL}$ is equalized with the reference voltage Vr. Under these circumstances, the bridge voltage Vb is indicative of the amount of fluid flow.

Resistor R2 in the lower arm of the bridge completing the bridge configuration with resistor R1 in series with the ambient sensing resistor RA is useful in bridge balance and calibration. The bridge values are selected so that the bridge will be balanced when the flow sensing resistor RH is at a prescribed temperature differential above the ambient temperature. As airflow changes tend to result in resistor RH changes, the bridge tends to unbalance and the amplifier makes a correction in the applied bridge voltage to restore the resistor temperature differential and thus the bridge balance. The applied bridge voltage Vb therefore varies with airflow and is useful as a measure of mass airflow.

The hot-wire type of sensor has several limitations. In particular, the RH and RA resistances are not consistent enough to have single value resistors to form the Wheatstone bridge described above. To compensate for the RH and RA resistance value variations, thick film resistors are laser trimmed to individually match corresponding RH and RA values. Furthermore, the Wheatstone bridge requires a costly ambient temperature sensor having a resistance vs. temperature characteristic similar to the heated sensor. Thus, it would be desirable to temperature compensate a hot wire anemometer without costly laser trimmed resistors and an ambient temperature sensor.

SUMMARY OF THE INVENTION

Disclosed herein is a method and apparatus for measuring the amount of flow of a flowing medium. The apparatus includes a bridge circuit across which a bridge voltage Vb is developed such that the magnitude of the bridge voltage Vb is indicative of the amount of flow. The bridge circuit has a signal side for deriving a signal voltage $V_{RL}$ which is a voltage divided function of the bridge voltage Vb as determined at least in part by the resistance RH of a self-heated resistor in ratio to the resistance RL of a power resistor where the resistance RH is related to the temperature of the heated resistor as determined at least in part by the difference between the heat generated within the heated resistor as a function of the voltage applied across the heated resistor and the heat transferred away from the heated resistor as a function of the amount of fluid flow. The bridge circuit also has a reference side for defining a reference voltage Vr which is a voltage divided function of the bridge voltage Vb as determined at least in part by a resistance Rp of a potentiometer. The bridge circuit further includes an amplifier responsive to the difference between the signal voltage $V_{RL}$ and the reference voltage Vr for altering the bridge voltage Vb to maintain the heat generated within the self-heated resistor thereby maintaining its temperature and related resistance RH so as to equalize the signal voltage $V_{RL}$ and the reference voltage Vr.

The method for temperature compensation of a constant temperature anemometer described above further includes generating a temperature reference voltage indicative of ambient temperature from a thermistor circuit; receiving the uncompensated bridge voltage and the temperature reference voltage in a conditioning circuit configured to process the uncompensated bridge voltage and the temperature reference voltage; and generating a compensated bridge voltage with respect to ambient temperature. The compensated bridge voltage indicative of fluid flow across resistor RH in an ambient temperature range.

The above described and other features are exemplified by the following figures and detailed description.

BRIEF DESCRIPTION OF THE DRAWINGS

Referring now to the Figures wherein like elements are numbered alike.

DESCRIPTION OF THE PREFERRED EMBODIMENT

Figure 2:
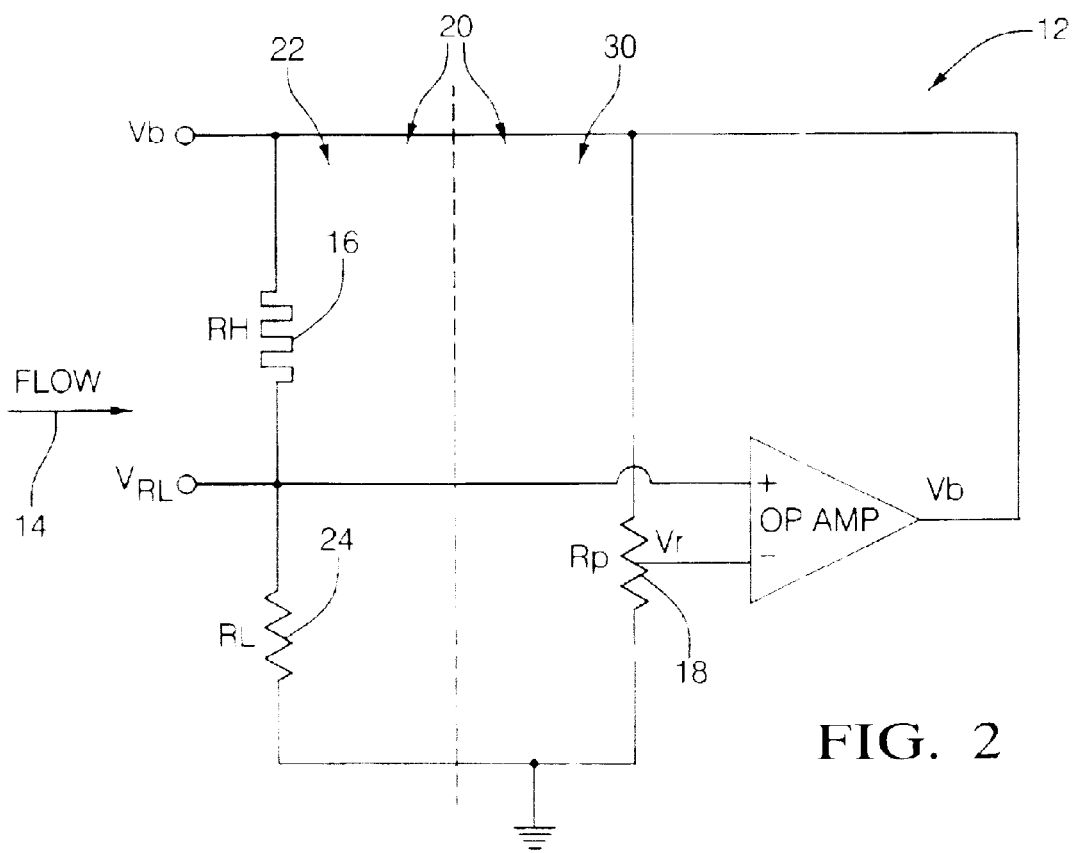
FIG. 2 is a schematic diagram of an exemplary embodiment of an airflow meter circuit.

Referring to FIG. 2, a circuit schematic of an exemplary embodiment of a flowmeter 12 is illustrated for measuring the amount of fluid flow through a conduit (not shown). An arrow 14 indicates the direction of flow from left to right. As one example, the fluid may be air and the conduit may be part of an intake passage of an internal combustion engine (not otherwise shown). In the latter event, the flowmeter 12 measures the mass airflow through the conduit into the engine.

Flowmeter 12 is of the "hot wire" variety, i.e., it includes a self-heated sensor resistor 16 having a resistance RH which is a function of its temperature ($T_{RH}$). Preferably, the heated resistor 16 is mounted within the conduit so as to be exposed to the fluid flow therethrough. The temperature of the heated resistor 16 (and its related resistance RH) is determined, at least in part, by the difference between the heat generated within resistor 16 as a function of the voltage applied thereacross and the heat transferred away from resistor 16 as a function of the cooling fluid flow thereover.

Flowmeter 12 also includes a resistive element 18 electrically coupled in parallel with resistor 16. The resistive element 18 has a resistance determined by a desired constant temperature of resistor 16.

In addition, flowmeter 12 includes a bridge circuit 20 within which the self-heating resistor 16 and the resistive element 18 are connected. In operation, a voltage Vb is developed across the bridge circuit 20 where the magnitude of the bridge voltage Vb is indicative of the amount of fluid flow across resistor 16 and through the conduit.

More specifically, the bridge circuit 20 includes a signal side 22 for deriving a signal voltage $V_{RH}$ which is a voltage divided function of the bridge voltage Vb as determined in part by the resistance RH of the heated resistor 16 in ratio to the resistance RL of a power dissipating resistor 24. The signal voltage $V_{RL}$ is tapped from between the resistors 16 and 24.

Figure 1:
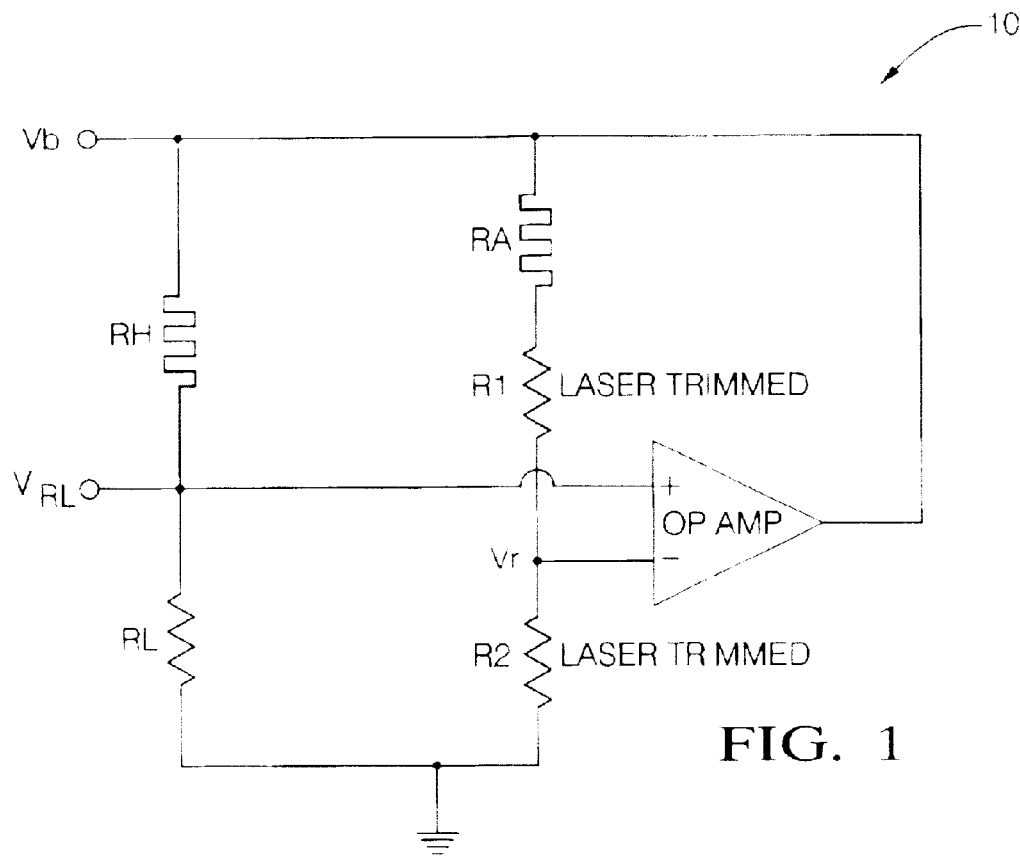
FIG. 1 is a schematic diagram of a conventional airflow meter circuit.

As a further matter, the bridge circuit 20 includes a reference side 30 for defining a reference voltage Vr which is a voltage divided function of the bridge voltage Vb as determined using a digital programmable potentiometer for resistive element 18 to compensate for part to part variation in the heated resistor 16. To achieve identical temperature behavior between different flow meters, the temperature of the heated resistor 16 should be the same. It will be recognized that the temperature of the heated resistor 16 is set by the voltage divider on reference side 30. In an exemplary embodiment, the voltage divider needed on reference side 30 is constructed using a digital programmable potentiometer to configure resistive element 18 thus eliminating the need for laser trimmed resistors R1 and R2 shown with respect to FIG. 1. The reference voltage Vr is then tapped from resistive element 18.

In addition, the flowmeter 12 includes an operational amplifier 32 for driving the bridge circuit 20. More particularly, amplifier 32 is responsive to the difference between the signal voltage $V_{RL}$ and the reference voltage Vr to alter the bridge voltage Vb thereby correspondingly altering the voltage applied across the self-heated resistor 16 so as to change the heat generated therein. As a result, the temperature of the heated resistor 16 and its related resistance RH are modified such that the signal voltage $V_{RL}$ equals the reference voltage Vr (i.e., the difference between the two voltages $V_{RL}$ and Vr is zero).

Figure 3:
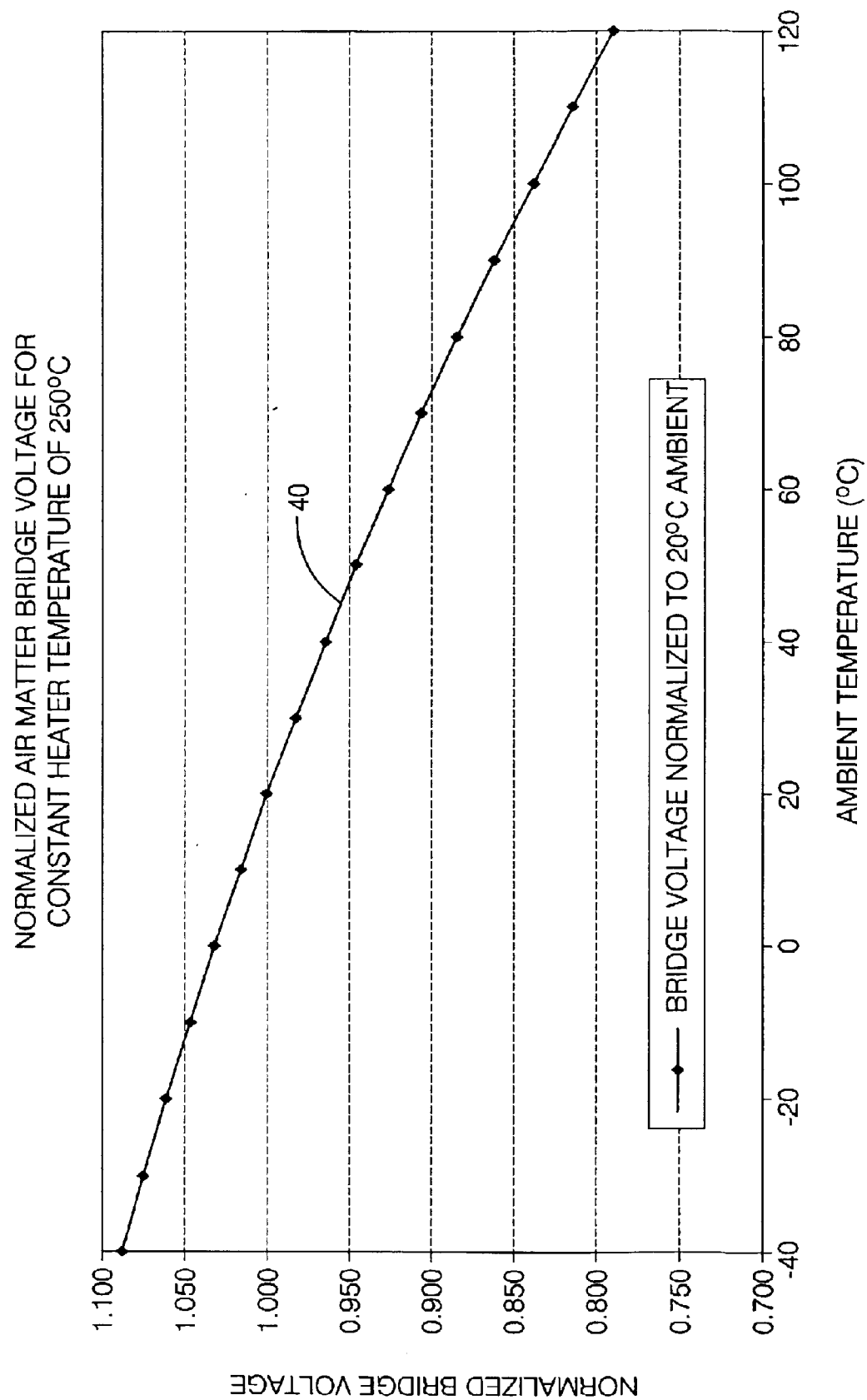
FIG. 3 is a graph illustrating how a bridge voltage in the circuit of FIG. 2 changes with ambient temperature with a heated sensor heated at a constant 250° C.

Referring now to FIG. 3, a graph depicted generally at 40 shows how the bridge voltage Vb changes with respect to ambient temperature when resistor 16 is maintained at 250° C. In the exemplary flowmeter depicted in FIG. 2, it is desirable that the bridge voltage Vb be temperature compensated over the ambient temperature range. This means that for any given amount of flow, the change in bridge voltage Vb is controlled in a prescribed fashion as the ambient temperature changes. For instance, it may be desirable that the bridge voltage Vb change in a predetermined manner over the ambient temperature range so as to cancel or compensate for some inverse temperature responsive change that would be otherwise be induced in the bridge voltage Vb. In an exemplary embodiment illustrated in FIGS. 4 and 5 the bridge voltage Vb is fed through a subsequent voltage conditioning circuit 50 that produces an output 52 which is a temperature responsive function of the bridge voltage.

Figure 4:
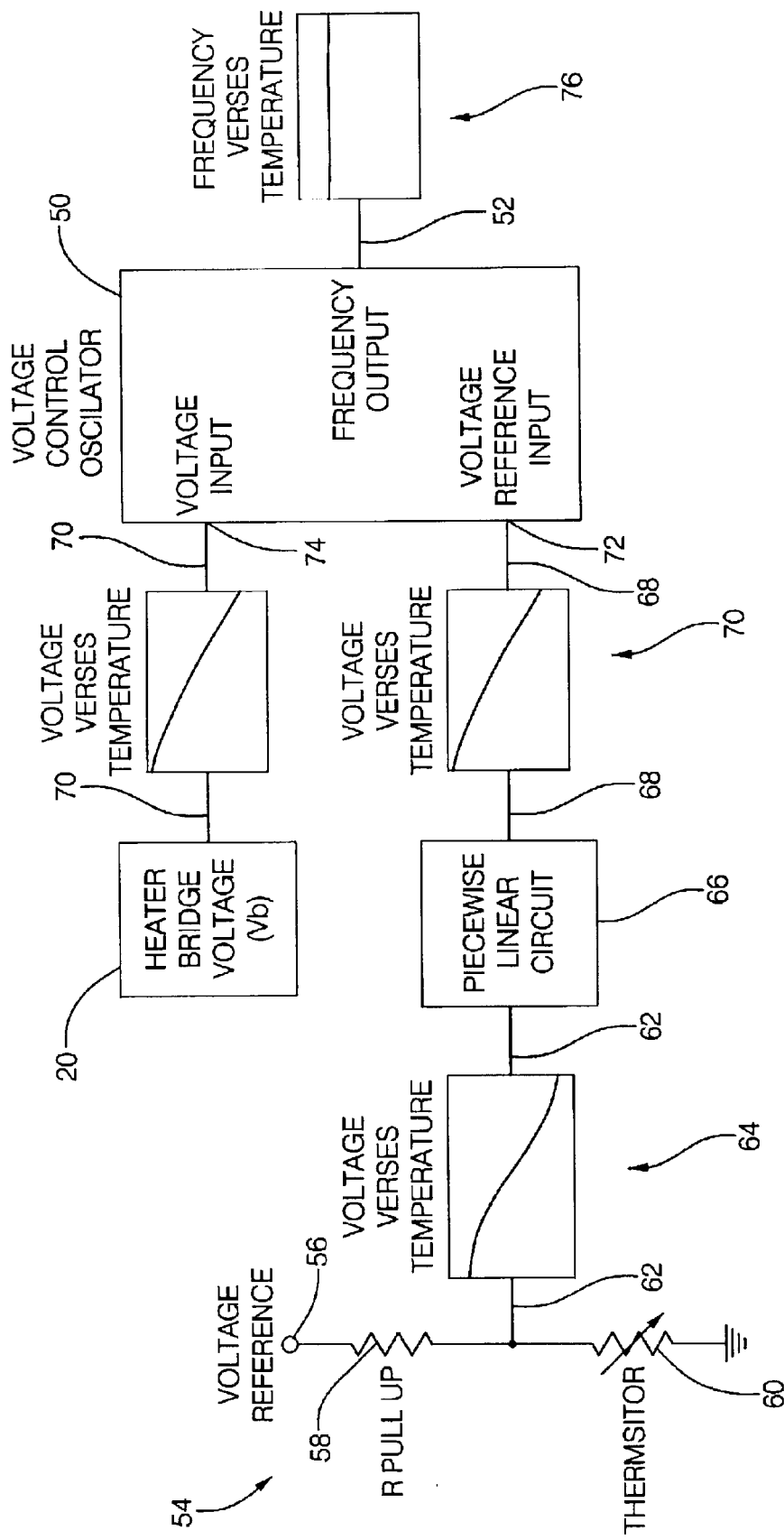
FIG. 4 is a schematic diagram of a frequency output air meter employing the circuit of FIG. 2 and a thermistor circuit to correct bridge voltage for ambient temperature changes.
Figure 5:
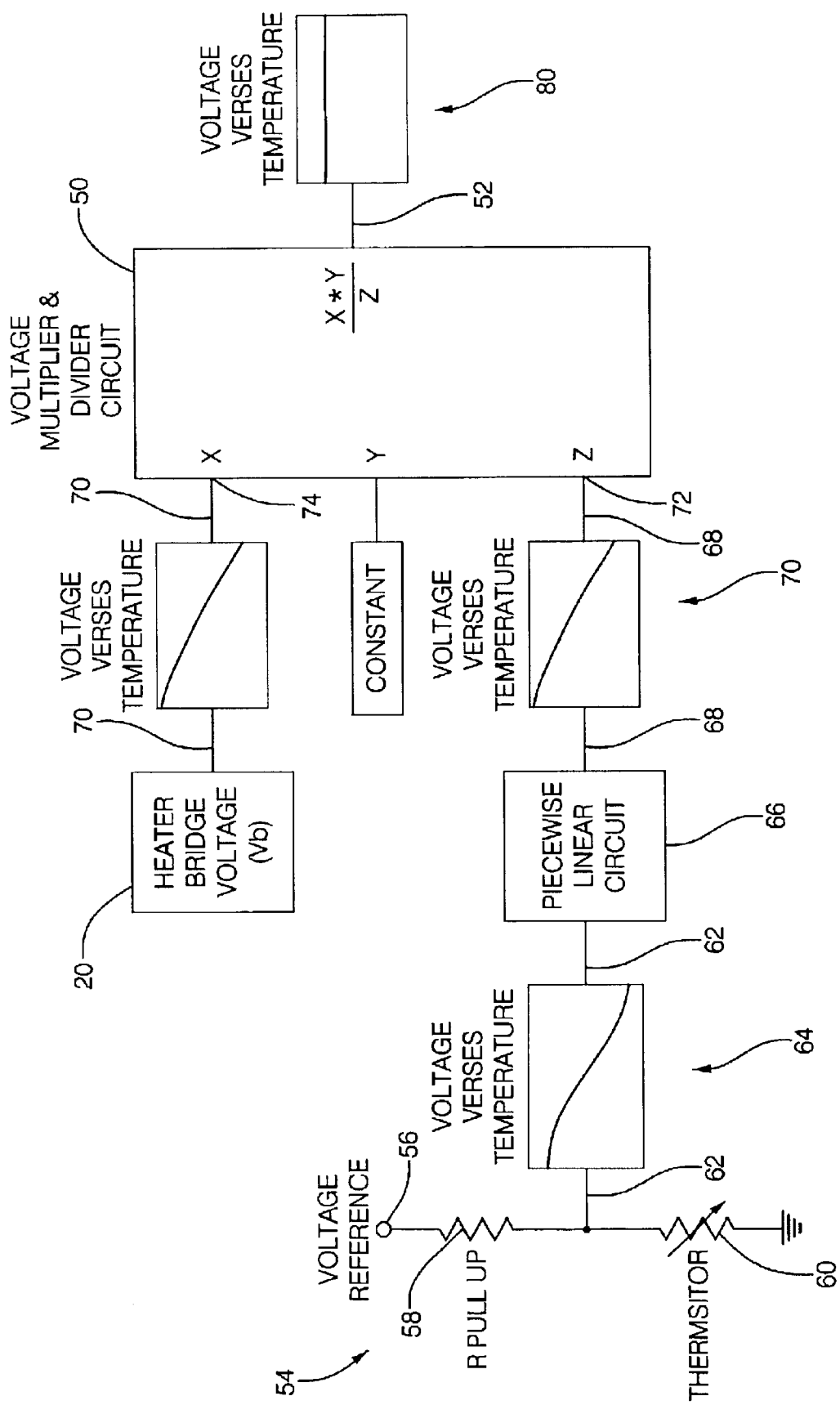
FIG. 5 is a schematic diagram of a voltage output flow meter employing the circuit of FIG. 2 and a thermistor circuit to correct bridge voltage for ambient temperature changes.

Referring to FIGS. 4 and 5, a low cost thermistor circuit 54 is employed to create a correction voltage for use with conditioning circuit 50. Thermistor circuit is a voltage divider having a voltage reference 56 applied thereto. Thermistor circuit 54 includes a pull up resistor 58 and a thermistor 60. A reference voltage signal 62 is tapped from between the resistors 58 and 60. Reference voltage signal 62 is shown over a wide ambient temperature range at 64 such that the voltage vs. temperature characteristic may not match the voltage vs. temperature characteristic illustrated at 70. In such case, a piecewise linear circuit 66 may be required to achieve the desired accuracy. Piecewise linear circuit 66 outputs a corrected reference voltage output signal 68 that substantially duplicates the voltage vs. temperature characteristic illustrated at 70. Corrected reference voltage signal 68 is then input to conditioning circuit 50 along with a heater bridge voltage signal 72 (i.e., Vb) determined in bridge circuit 20 of FIG. 2.

It has been found that low cost thermistors provide more than 1.0° C. accuracy over an entire ambient temperature range of about −40° C. to about 125° C. Moreover, many applications using flowmeter 12 may also require an air temperature signal. By tapping reference voltage signal 62 from thermistor 60, this thermistor signal may optionally provide an air temperature output signal in parallel with reference voltage signal 62 indicative of the ambient air temperature.

In the flowmeter 12, since it is desirable that the bridge voltage Vb be temperature compensated over the ambient temperature range of the flowing fluid, this means that for any given amount of flow, the change in bridge voltage Vb is controlled in a prescribed fashion as the ambient temperature $T_{amb}$ of the fluid changes by employing conditioning circuit 50.

The present disclosure is directed to an approach for temperature compensating the bridge voltage Vb over the ambient temperature range of the flowing fluid. The inventive approach is based on holding the temperature of the heated resistor 16 constant and processing the bridge voltage to correct for ambient temperature changes using conditioning circuit 50. In this manner, a costly ambient air sensor in the Wheatstone bridge of FIG. 1 can be eliminated. In order to temperature compensate the constant temperature heated resistor 16 in flowmeter 12, the bridge voltage Vb is modified by the inverse of a heater bridge voltage equation shown below.

$$\left[ \frac{(T_{RH} - T_{amb}) \cdot P_{CONVECTIVE}(T_{amb}) \cdot [RH(T_{RH}) + RL]^2}{RH(T_{RH})} \right]^{1/2}$$

Where: Vb is the flow bridge voltage.
$T_{RH}$=Heated Resistor Temperature
$T_{amb}$=Ambient Air Temperature
$P_{CONVECTIVE}(T_{amb})$=Convective heat transfer from the Heated Resistor
$RH(T_{RH})$=Resistance of RH when heated to $T_{RH}$
RL=Resistance of RL More specifically with reference to FIG. 4, for a frequency output air meter generally shown, conditioning circuit 50 is a voltage controlled oscillator circuit to correct the temperature uncompensated bridge voltage Vb for ambient temperature changes. Corrected reference voltage signal 68 is applied to a reference voltage input 72 of the voltage controlled oscillator circuit and bridge voltage signal 70 is applied to a heater bridge voltage input 74 of the voltage controlled oscillator circuit. The voltage controlled oscillator circuit generates output 52 that is indicative of a frequency output. The frequency output is indicative of a compensated bridge voltage over the ambient temperature range indicated generally as graph 76. Graph 76 indicates a compensated bridge voltage Vb as a frequency output over the ambient temperature range and processed by the voltage controlled oscillator circuit as follows:

$$\text{Frequency Output} = \frac{UncompensatedBridgeVoltage\ (Vb)}{CorrectedReferenceVoltage} \cdot \text{Constant}$$

In other words, conditioning circuit 50 processes the compensated bridge voltage by multiplying the bridge voltage input Vb by a constant and an inverse of the above described bridge voltage equation:

$$\left[ \frac{(T_{RH} - T_{amb}) \cdot P_{CONVECTIVE}(T_{amb}) \cdot [RH(T_{RH}) + RL]^2}{RH(T_{RH})} \right]^{1/2}$$

Referring now to FIG. 5, in another embodiment using a voltage output meter generally shown, conditioning circuit 50 is an analog multiplier-divider bridge voltage compensation circuit to correct the temperature uncompensated voltage Vb for ambient temperature changes. Corrected reference voltage signal 68 is applied to reference voltage input 72 (Z) of the analog multiplier-divider bridge voltage compensation circuit and uncompensated bridge voltage signal 70 is applied to input 74 (X) of the analog multiplier-divider bridge voltage compensation circuit. The constant is applied to input (Y). The analog multiplier-divider bridge voltage compensation circuit generates output 52 that is indicative of a voltage output. The voltage output is indicative of a compensated bridge voltage over the ambient temperature range indicated generally as graph 80. Graph 80 indicates a compensated bridge voltage Vb as a voltage output over the ambient temperature range and processed by the voltage controlled oscillator circuit as follows:

$$\text{Voltage Output} = \frac{UncompensatedBridgeVoltage\ (Vb)}{CorrectedReferenceVoltage} \cdot \text{Constant}$$

or, $$= \frac{X}{Z} \cdot Y$$

$$\text{Where } Z = \left[ \frac{(T_{RH} - T_{amb}) \cdot P_{CONVECTIVE}(T_{amb}) \cdot [RH(T_{RH}) + RL]^2}{RH(T_{RH})} \right]^{1/2}$$

Referring again to FIGS. 1 and 2, it will be recognized by one skilled in the pertinent art that in order to achieve similar temperature behavior, the temperature of heated resistor 16 must be the same on every air meter. To achieve similar temperature behavior, the temperature of the heated resistor 16 is set by the voltage divider in reference side 30. More specifically, this voltage divider needs to be adjustable to account for part-to-part variation between different heated resistors 16. By using a voltage divider on reference side 30 configured with a digital programmable potentiometer, employment of laser trimmed resistors can be eliminated. For example, the resistances of resistors R1 and R2 of the prior art voltage divider are variable resistances which are adjusted to the values calculated in accordance with the previously described aspects of the invention. In the prior art, the resistors R1 and R2 are provided in the form of thick-film or thin-film resistors which are fabricated on a substrate and interconnected by conductive leads. The resistances of resistors R1 and R2 are individually trimmed to the desired values by a laser trimming apparatus which necessitates a laser for trimming resistors R1 and R2 (e.g., vaporizing a slit in the resistor), a pair of probes for monitoring the resistances during the laser trimming process, and a control unit for controlling the laser to trim resistors R1 and R2 to the desired values of resistance. This extensive process of laser trimming is eliminated with a digital programmable potentiometer Rp in place of laser trimmed resistors R1 and R2.

Furthermore, the need for an expensive ambient temperature sensor is eliminated by the above described flow meter. By eliminating the ambient temperature sensor, lead frames also eliminated. Moreover, by employing a thermistor circuit to generate a correction voltage, power dissipation decreases with increasing temperature and an optional air temperature signal is available. In addition, elimination of laser trimmed resistors eliminates a requirement for a costly ceramic board material used in conjunction with the laser trimmed resistors.

While the invention has been described with reference to an exemplary embodiment, it will be understood by those skilled in the art that various changes may be made and equivalents may be substituted for elements thereof without departing from the scope of the invention. In addition, many modifications maybe made to adapt a particular situation or material to the teachings of the invention without departing from the essential scope thereof. Therefore, it is intended that the invention not be limited to the particular embodi-

What is claimed is:

1. An apparatus for measuring the amount of flow of a flowing medium comprising:

a bridge circuit across which a bridge voltage Vb is developed such that the magnitude of the bridge voltage Vb is indicative of the amount of flow, the bridge circuit including a signal side for deriving a signal voltage $V_{RL}$ which is a voltage divided function of the bridge voltage Vb as determined at least in part by the resistance RH of a self-heated resistor in ratio to the resistance RL of a power resistor where the resistance RH is related to the temperature of the heated resistor as determined at least in part by the difference between the heat generated within the heated resistor as a function of the voltage applied across the heated resistor and the heat transferred away from the heated resistor as a function of the amount of fluid flow, the bridge circuit also including a reference side for defining a reference voltage Vr which is a voltage divided function of the bridge voltage Vb as determined at least in part by a resistance Rp of a potentiometer, and an amplifier responsive to the difference between the signal voltage $V_{RL}$ and the reference voltage Vr for altering the bridge voltage Vb to maintain the heat generated within the self-heated resistor thereby maintaining its temperature and related resistance RH so as to equalize the signal voltage $V_{RL}$ and the reference voltage Vr.

2. The apparatus of claim 1, wherein said potentiometer is a digital programmable potentiometer.

3. The apparatus of claim 1, wherein the bridge voltage is further processed to correct for ambient air temperature changes.

4. The apparatus of claim 3 further comprising:

a thermistor circuit configured to generate a temperature reference voltage to correct the bridge voltage Vb with respect to ambient air changes.

5. The apparatus of claim 4, wherein the temperature reference voltage is tapped from between a pull up resistive element electrically connected to a voltage reference source and a thermistor element electrically connected to ground.

6. The apparatus of claim 5, wherein the temperature reference voltage is indicative of ambient air temperature.

7. The apparatus of claim 5, wherein the temperature reference voltage and the bridge voltage Vb are input into a conditioning circuit to generate a compensated bridge voltage with respect to ambient air temperature.

8. The apparatus of claim 7, wherein the conditioning circuit processes the compensated bridge voltage by multiplying the bridge voltage input by a constant and an inverse of the following equation:

$$\left[\frac{(T_{RH} - T_{amb}) \cdot P_{CONVECTIVE}(T_{amb}) \cdot [RH(T_{RH}) + RL]^2}{RH(T_{RH})}\right]^{1/2}$$

Where: Vb is the bridge voltage input
$T_{RH}$=Heated Resistor Temperature
$T_{amb}$=Ambient Air Temperature
$P_{CONVECTIVE}(T_{amb})$=Convective heat transfer from the Heated Resistor
$RH(T_{RH})$=Resistance of RH when heated to $T_{RH}$
RL=Resistance of RL.

9. The apparatus of claim 8, wherein said temperature reference voltage is processed with a linear piecewise circuit prior to processing with the conditioning circuit for ambient temperature ranges greater than about 50° C.

10. The apparatus of claim 8, wherein the conditioning circuit is one of a voltage controlled oscillator circuit and an analog multiplier-divider circuit.

11. The apparatus of claim 10, wherein said voltage controlled oscillator circuit outputs a frequency output indicative of a compensated bridge voltage with respect to ambient temperature.

12. The apparatus of claim 10, wherein said analog multiplier-divider circuit outputs a voltage output indicative of a compensated bridge voltage with respect to ambient temperature.

13. The apparatus of claim 5, wherein said thermistor element is one of a thermistor and a temperature dependent resistive element.

14. A method for temperature compensation of a constant temperature anemometer for measuring the amount of flow of a flowing medium, the method comprising:

configuring a bridge circuit to develop a bridge voltage Vb such that the magnitude of the bridge voltage Vb is indicative of the amount of flow, generating an bridge voltage from the bridge circuit, the bridge voltage Vb is uncompensated with respect to ambient temperature;

generating a temperature reference voltage indicative of ambient temperature from a thermistor circuit;

receiving the uncompensated bridge voltage Vb and the temperature reference voltage in a conditioning circuit configured to process the uncompensated bridge voltage Vb and the temperature reference voltage; and generating a compensated bridge voltage with respect to ambient temperature, the compensated bridge voltage indicative of fluid flow across resistor RH in an ambient temperature range.

15. The method of claim 14, wherein configuring the bridge circuit further comprises:

including a signal side for deriving a signal voltage $V_{RL}$ which is a voltage divided function of the bridge voltage Vb as determined at least in part by the resistance RH of a self-heated resistor in ratio to the resistance RL of a power resistor where the resistance RH is related to the temperature of the heated resistor as determined at least in part by the difference between the heat generated within the heated resistor as a function of the voltage applied across the heated resistor and the heat transferred away from the heated resistor as a function of the amount of fluid flow;

including a reference side for defining a reference voltage Vr which is a voltage divided function of the bridge voltage Vb as determined at least in part by a resistance Rp of a potentiometer; and including an amplifier responsive to the difference between the signal voltage $V_{RL}$ and the reference voltage Vr for altering the bridge voltage Vb to maintain the heat generated within the self-heated resistor thereby maintaining its temperature and related resistance RH so as to equalize the signal voltage $V_{RL}$ and the reference voltage Vr.

16. The method of claim 15, wherein said potentiometer is a digital programmable potentiometer.

17. The method of claim 14, wherein the bridge voltage is further processed to correct for ambient air temperature changes.

18. The method of claim 14, wherein the temperature reference voltage is tapped from between a pull up resistive element electrically connected to a voltage reference source and a thermistor element electrically connected to ground.

19. The method of claim 14, wherein the conditioning circuit processes the compensated bridge voltage by multiplying the bridge voltage input by a constant and an inverse of the following equation:

$$\left[ \frac{(T_{RH} - T_{amb}) \cdot P_{CONVECTIVE}(T_{amb}) \cdot [RH(T_{RH}) + RL]^2}{RH(T_{RH})} \right]^{1/2}$$

Where: Vb is the bridge voltage input
$T_{RH}$=Heated Resistor Temperature
$T_{amb}$=Ambient Air Temperature
$P_{CONVECTIVE}(T_{amb})$=Convective heat transfer from the Heated Resistor
$RH(T_{RH})$=Resistance of RH when heated to $T_{RH}$
RL=Resistance of RL.

20. The method of claim 14, wherein said temperature reference voltage is processed with a linear piecewise circuit prior to processing with the conditioning circuit for ambient temperature ranges greater than about 50° C.

21. The method of claim 14, wherein the conditioning circuit is one of a voltage controlled oscillator circuit and an analog multiplier-divider circuit.

22. The method of claim 21, wherein said voltage controlled oscillator circuit outputs a frequency output indicative of a compensated bridge voltage with respect to ambient temperature.

23. The method of claim 21, wherein said analog multiplier-divider circuit outputs a voltage output indicative of a compensated bridge voltage with respect to ambient temperature.

* * * * *